May 13, 1924.

M. SACHS

BELT BUCKLE

Filed March 30, 1922

1,493,647

INVENTOR.
Morris Sachs
BY
Davis & Timmons
ATTORNEYS.

Patented May 13, 1924.

1,493,647

UNITED STATES PATENT OFFICE.

MORRIS SACHS, OF ROCHESTER, NEW YORK, ASSIGNOR TO HICKOK MANUFACTURING COMPANY, INC., OF ROCHESTER, NEW YORK, A CORPORATION OF NEW YORK.

BELT BUCKLE.

Application filed March 30, 1922. Serial No. 548,120.

*To all whom it may concern:*

Be it known that I, MORRIS SACHS, a citizen of the United States, and resident of Rochester, in the county of Monroe and State of New York, have invented certain new and useful Improvements in Belt Buckles, of which the following is a specification.

The present invention relates to belt buckles and an object thereof is to provide a belt buckle with a pivoted anchoring member of two parts, one of which is pivotally connected to the buckle frame and the other of which is connected to a belt end, provision being made by which the part to which the belt end is secured may be reversibly connected to the pivotally mounted part so that the belt may be reversed, this being particularly desirous when the belt has its opposite faces differently formed or colored, so that the exposed face may be adapted to the color of the other garments of the wearer. Another object of the invention is to provide a reversible connection between the two parts of a pivotally mounted belt anchoring member, such connection being simple of operation and inexpensive to manufacture.

To these and other ends, the invention consists of certain parts and combinations of parts, all of which will be hereinafter described: the novel features being pointed out in the appended claims.

Figure 1:
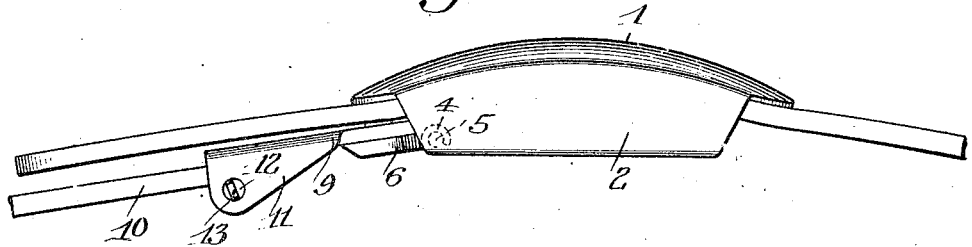
Fig. 1 shows in side elevation a buckle constructed in accordance with this invention.
Figure 2:
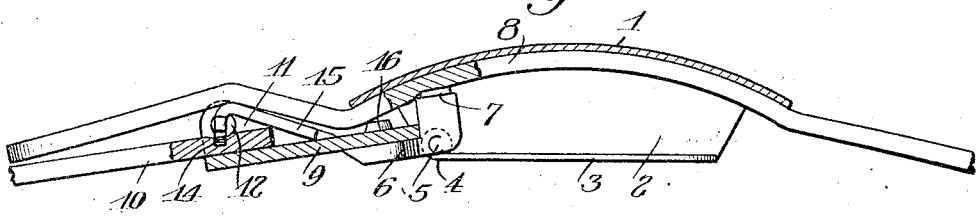
Fig. 2 is a longitudinal section through the buckle.
Figure 3:
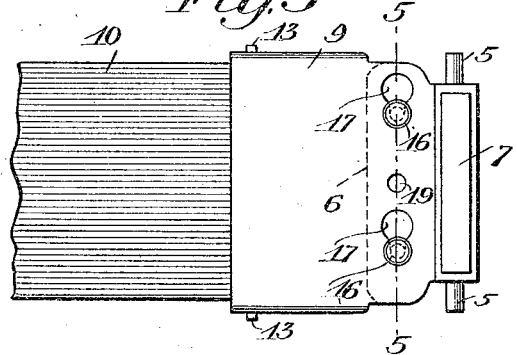
Fig. 3 is a fragmentary view showing the belt securing part in one position.
Figure 4:
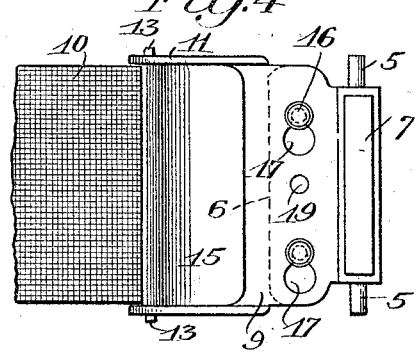
Fig. 4 is a similar view showing the said part in another position.
Figure 5:
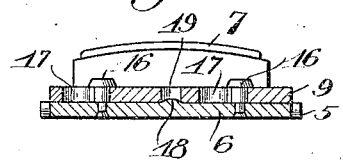
Fig. 5 is a section on the line 5—5, Fig. 3.
Figure 6:
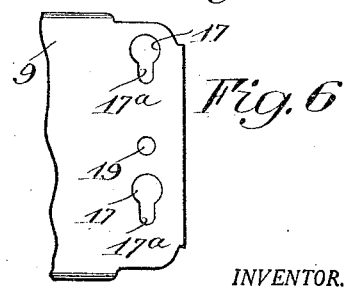
Fig. 6 is a detail view of the belt securing part.

In the illustrated embodiment of the invention, 1 indicates the front plate of a buckle frame which has side flanges 2, in this instance, formed with inwardly turned portions 3 provided at their ends with rolled portions 4, forming the bearings for the pivots 5 of the anchoring member for one end of the belt. The anchoring member, in this instance, embodies an inner pivoted part 6 which preferably has a clamping surface 7 formed thereon for clamping one end 8 of a belt against the rear face of the front plate 1. The anchoring member also embodies a belt securing part 9 which is detachably secured to the belt end 10. In this instance, the belt securing part is in the form of a plate with side flanges 11 formed with bearings 12 for pintles 13 on opposite sides of another clamping member. This latter clamping member has a belt engaging portion 14 on one side of the pivots 13 and an operating portion or arm 15 on the opposite side of the pivot, said operating portion 15 being at an angle to the clamping portion 14 and, when in a clamping position, abutting the face of the plate 9 between the flanges 11. This construction has the advantage that the operating part does not interfere with the passage of the belt end 8 over the clamping member. In fact, it acts as a guide for said belt end 8.

There is a demand for a reversible belt with two different facings, one designed for use with dark clothes and the other designed for use with light clothes. In order that the parts of the belt anchoring member may be connected together so as to expose either of these facings of the belt, a detachable connection between the parts of the belt anchoring member is provided. The connection, in this instance, employs two headed lugs or projections 16 extending from that face of the anchoring member disposed toward the rear face of the front plate 1 and slots 17 are provided in the part 9 beyond the clamping arm 15, the slots having reduced portions 17$^a$. The headed projections 15 pass through the enlarged portions of the slots and the part 9 is shifted in its plane, so as to cause the portions of the headed projections below the heads to pass into the reduced portions 17$^a$, thus preventing separation of the two parts of the anchoring member. A boss or projection 18 on the part 6 enters into an opening 19 in the part 9 and holds the two parts against movement. The headed projections 16 of the slots 17 are so formed that when the member 9 connects with the member 6, in either position the centers of the two members 6 and 9 will be alined.

What I claim as my invention and desire to secure by Letters Patent is:

1. A belt buckle comprising a buckle frame, a pivoted anchoring member for one end of a belt, said anchoring member being formed of two parts, one of which is pivotally connected to the buckle frame, and the other of which has means for connecting the belt end thereto, and means for detachably connecting the belt end securing part to the pivotally mounted part, so that either of the two faces of the belt end securing part may be disposed forwardly, said detachable securing means comprising headed pins on one of said parts, and the other part being provided with slots formed with reduced portions in which the headed pins are received the lengths of the slots extending transversely of the length of a belt secured to said belt securing means.

2. A belt buckle comprising a buckle frame, a pivoted anchoring member for one end of a belt, said anchoring member being formed of two parts, one of which is pivotally connected to the buckle frame, and the other of which has means for connecting the belt end thereto, and means for detachably connecting the belt end securing part to the pivotally mounted part, so that either of the two faces of the belt end securing part may be disposed forwardly, said detachable securing means comprising headed pins on one of said parts, the other part being provided with slots formed with reduced portions in which the headed pins are received, the lengths of the slots extending transversely of the length of a belt secured to said belt securing means, the pins and the slots being so positioned that the centers of the two parts are alined in either position of the belt end securing part on the pivotally mounted part.

MORRIS SACHS.